United States Patent [19]

Bolssens et al.

[11] 3,967,357
[45] July 6, 1976

[54] WIRE SKINNING AND WRAPPING TOOL

[75] Inventors: Frans Pharailda Jozef Bolssens, Heide Kalmthout; Guy Charles Joseph Leon Gilbert Ghislain Marie Franck, Borsbeek, both of Belgium

[73] Assignee: International Standard Electric Corporation, New York, N.Y.

[22] Filed: Sept. 3, 1975

[21] Appl. No.: 610,020

[52] U.S. Cl. ........................... 29/203 D; 7/14.1 R
[51] Int. Cl.² ....................................... H01R 43/04
[58] Field of Search ............... 7/14.1 R; 29/203 H, 29/203 D, 203 B, 203 R, 203 DG

[56] References Cited
UNITED STATES PATENTS 3,774,283  11/1973  Staiger ........................... 29/203 D

*Primary Examiner*—Al Lawrence Smith
*Assistant Examiner*—Roscoe V. Parker, Jr.
*Attorney, Agent, or Firm*—John T. O'Halloran; Peter Van Der Sluys

[57] ABSTRACT

A wire skinning and wrapping tool which is able to perform two successive skinning and wrapping operations includes a bit able to rotate and to slide to and fro in a hollow sleeve. During each skinning operation the bit moves in a forward direction away from a cut-out portion which is located at the base of the sleeve and through which the insulated wire is fed. After each wrapping operation the bit moves in a backward direction while it rotates over an angle of 180° together with the sleeve. Prior to the first skinning operation the wire is fed through the cut-out portion perpendicularly to the sliding direction and is pushed forward by the bit during the skinning operation. Prior to the second skinning operation the insulated wire which extends from the wire wrapped connections to the wire feeding means via the hollow sleeve is cut at the wire feeding place.

17 Claims, 21 Drawing Figures

WIRE SKINNING AND WRAPPING TOOL

The present invention relates to a wire skinning and wrapping tool for carrying out successive first and second wire skinning and wrapping operations, said tool including rotatable skinning and wrapping means to skin a portion of an insulated wire and to wrap the so obtained skinned portion and second means to bring said portion to be skinned and wrapped and said skinning and wrapping means in proximity of each other prior to each of said first and second skinning operations so that said portion may then be skinned.

Such a wire skinning and wrapping tool is already known from the U.S. Pat. No. 3,774,283 to B. Staiger. In this known tool which is used to make point to point wrapped connections without reloading the tool with an insulated wire between said first and second skinning and wrapping operations, the rotatable skinning and wrapping means include a wrapping bit which has a longitudinal groove and is able to slide in a hollow wrapping sleeve having a cutout portion and a longitudinal slit the latter of which is oppositely located with respect to the longitudinal groove. A motor which is able to rotate the bit at each wrapping operation stops this bit at the same angular position after each said wrapping operations. The said second means are constituted by an arm mounted on the outside of said tool and provided with a seizure finger. Prior to the first skinning operation feeding means feed a portion of said insulated wire to be skinned and wrapped and the seizure finger seizes this wire portion which is then pulled by the arm through the cut-out portion and is brought in a direction substantially perpendicular to the sliding direction of the bit. During the skinning operation the bit moves forward and pushes the above portion into the hollow sleeve in a direction away from the cut-out portion. The wire portion then skinned and the non skinned insulated wire become located in the longitudinal groove of the bit and in the longitudinal slit of the sleeve respectively. When this first skinning operation is finished the first wrapped connection is made whereafter the bit is slid in backward direction so that the insulated wire now extends from the first wrapped connection to the feeding means via the hollow sleeve. Prior to the second skinning operation the insulated wire is cut at the feeding place whereafter this second skinning operation and the second wrapping operation are performed in an analogous way as the first skinning and wrapping operations. Indeed, as mentioned before, after each wrapping operation the motor and associated bit occupy the same angular position as before this operation so that after the bit has slit in backward direction after the first wrapping operation the cut insulated wire has to be brought again in the above perpendicular direction by said arm and seizure finger.

A drawback of the known skinning and wrapping tool is that it is difficult to be operated since the arm mounted on the outside of the tool is an obstructing element especially when the above mentioned point to point connections have to be made in a bay where little room is available, e.g. due to the presence of a large number of jumper wires. Other drawbacks are that such an arm is a vulnerable element and that the seizure finger deforms the wire portion to be skinned.

It is therefore an object of the present invention to provide a tool of the above type which does not present the above drawbacks.

The present tool is characterized in that after each wrapping operation said second means are able to rotate said skinning and wrapping means so as to bring them in proximity of said portion to be skinned and wrapped.

In this way no arm and seizure finger are necessary to bring the wire portion to be skinned and wrapped in proximity of said skinning and wrapping means since now said skinning means are brought in proximity of said wire portions to be skinned and wrapped prior to each skinning operation.

The above mentioned and other objects and features of the invention will become more apparent and the invention itself will be best understood by referring to the following description of an embodiment taken in conjunction with the accompanying drawings in which.

Figure 1:
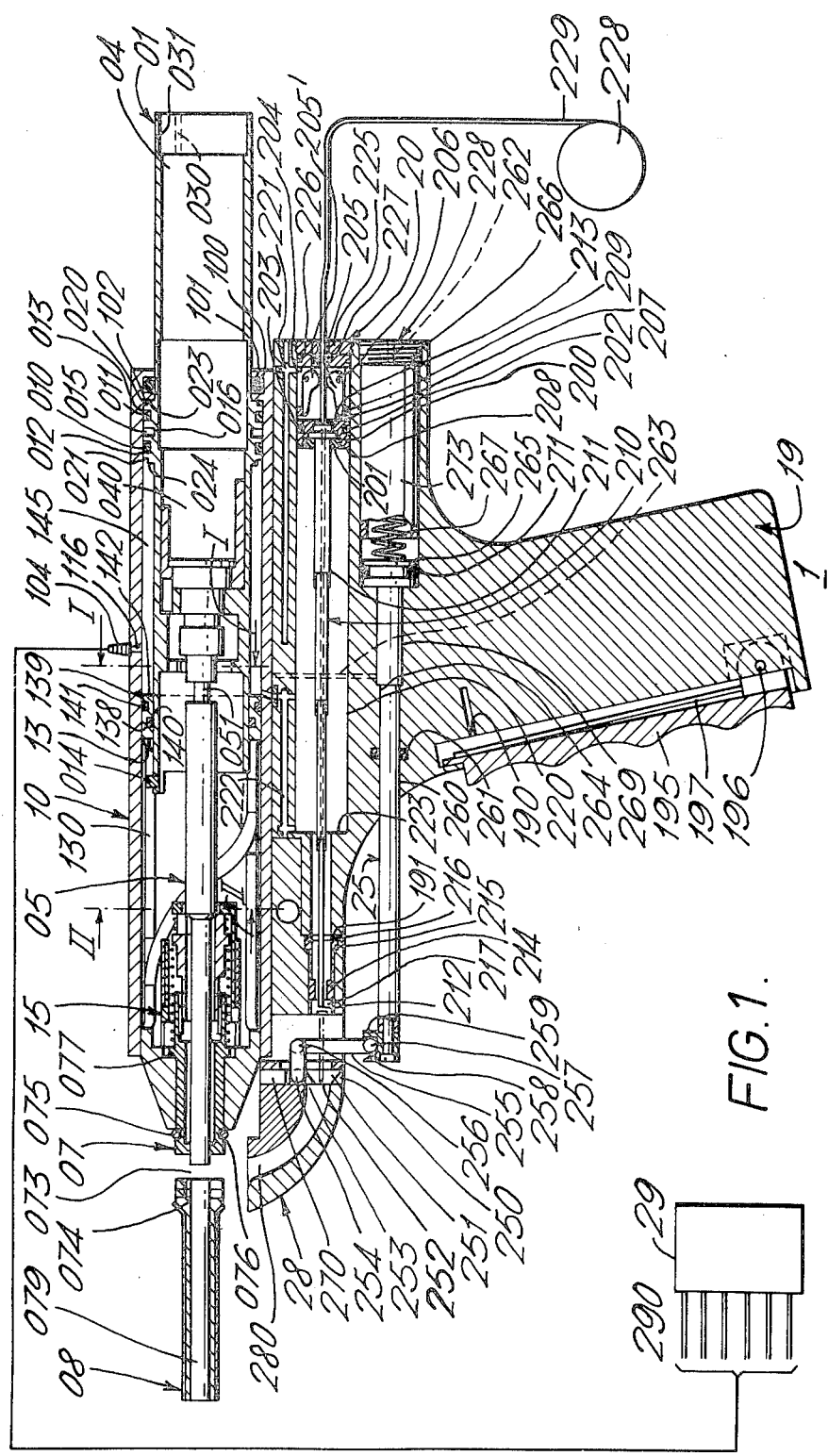
FIG. 1 shows a longitudinal section of a skinning and wrapping tool in its rest position and an accompanied control unit.

Principally referring to FIG. 1 a handtool 1 shown in cross section therein includes the following parts:
 a double acting piston 01 with axially mounted motor 04 and associated stop mechanism 040;
 a wrapping bit 05 axially fixed to the stop mechanism 040;
 a wrapping sleeve 07 and protecting sleeve 08;
 a housing 10 which constitutes the cylinder of the double acting piston 01;
 a guide cylinder 13;
 a clutch mechanism 15;
 a hand grip 19 with spring 197 and with trigger 195 pivoted about axle 196;
 a wire feeding means 20, called hereinafter wire feeding mechanism and a wire cutting mechanism 25;
 a deflector 28 to deflect an insulated wire 229 fed by the wire feeding mechanism 20.

The exemplary tool 1 is adapted for operation by compressed air but is not limited thereto. A control unit 29 including a pneumatic control circuit controls the supply of pressurized air to the tool 1 via conduits 290.

Figure 2:
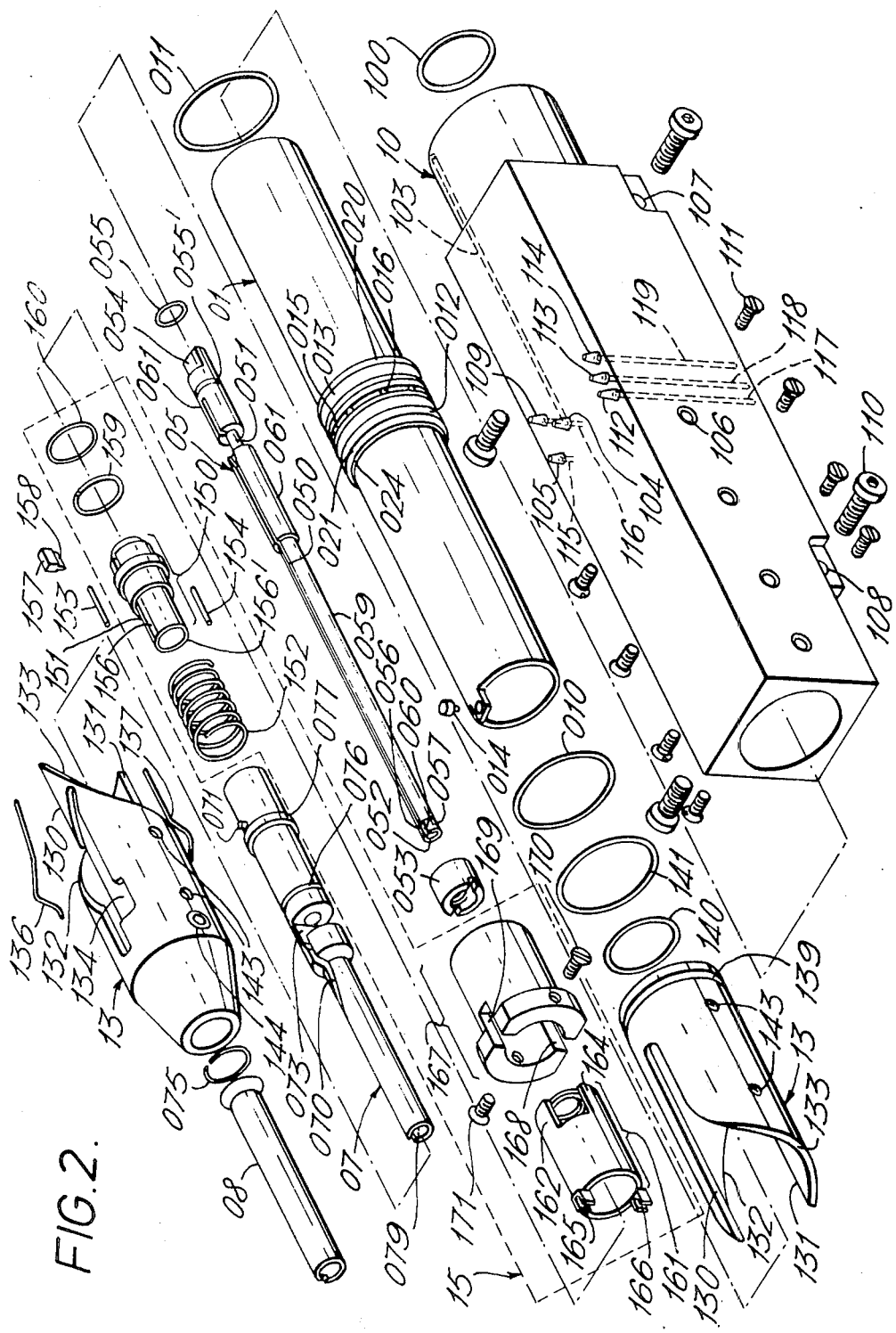
FIG. 2 is an exploded view of part of the skinning and wrapping tool shown in section in FIG. 1.

A perspective view of the cylinder 10, the piston 01, the wrapping bit 05, the clutch mechanism 15, the wrapping sleeve 07, the protecting sleeve o8 and the guide cylinder 13 are shown in the exploded view of FIG. 2. In this exploded view certain parts (the sleeve f.i.) shown therein are not exploded from their rest or initial positions but are drawn such as to show the maximum number of possible details.

Figure 3:
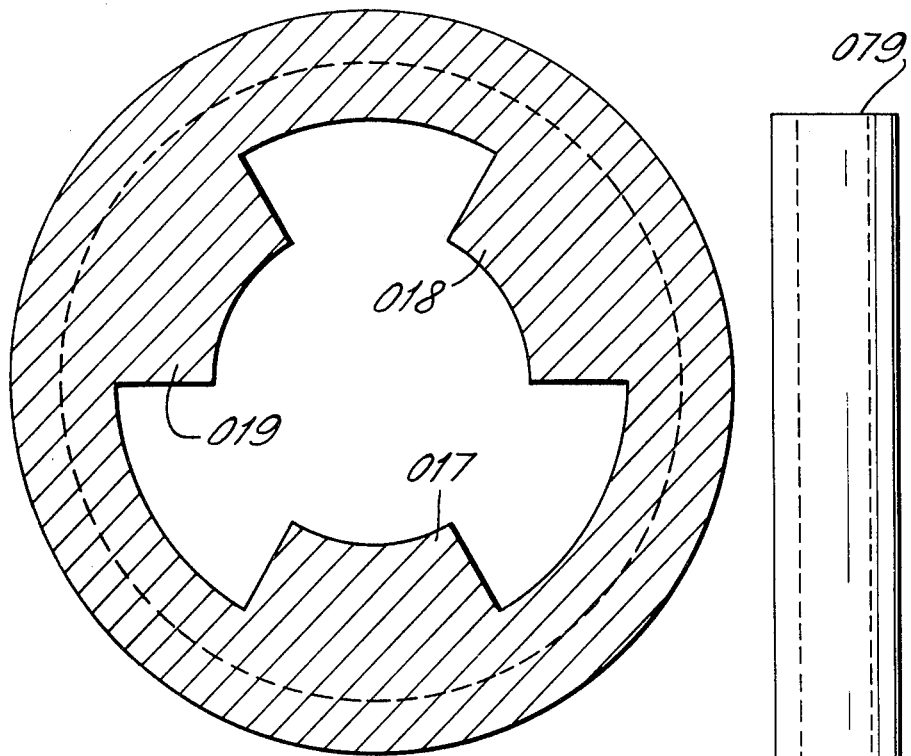
FIG. 3 is a cross section of the piston 01 shown in FIG. 1 and taken along the line II.

The double acting piston 01 with sealing rings 010 and 011 mounted in the respective annular grooves 012 and 013 is slidably mounted in the cylinder 10 and reciprocates therein between its rest position and its end position which is the position of the piston 01 when its active face 024 (FIG. 1) abuts against the rim 142 of the guide cylinder 13. In the above rest position of the piston 01 its active face 023 abuts against the annular face 102 of the cylinder 10. The piston 01 further has a piston pin 014 the purpose of which will become clear below and a circular groove 015 with orifices such as 016 through which pressurized air may be admitted to the motor 04 when the piston 01 is in its end position. This pressurized air is evacuated via holes such as 030 in the piston plug 031. A cross section along line II of FIG. 1 of the three piston teeth 017, 018 and 019 is shown in FIG. 3. The position of the three teeth shown therein corresponds with the piston rest position prior to the first skinning operation as explained below.

The housing 10 is provided with nipples 104, 105, 109, 112, 113, 114 (FIG. 2) giving access to the associated respective conduits 116, 115, 103, 117, 118 and 119 drawn in dashed lines. On the above nipples the conduits for pressurized air 290 are fixed. Pressurized air admitted via nipple 109 and conduit 103 to the rim 020 of the piston 01 moves the latter from its rest position so that the active face 023 is liberated, due to which the piston is able to move to its end position in forward direction. In this end position air may be supplied to the motor 04 via the nipple 104 and associated conduit 116 and the piston orifices 016 mentioned above to empower this motor, or to the rim 021 and active face 024 of the piston 01 via the nipple 105 and conduit 115 to move this piston from its end position to its rest position in backward direction. During the above forward and backward movements of the piston 01 the air emprisoned in the corresponding cylinder spaces to be emptied is evacuated via the respective conduits 115 and 103 and control unit 29. The tightness between the piston 01 and the cylinder 10 is insured by means of the sealing ring 100 mounted in the annular groove 101 on the one hand and by means of the sealing ring 140 and 141 mounted in the respective annular grooves 138 and 139 of the guide cylinder 13 on the other hand. It should be noted that the conduits 117, 118 and 119 further extend into the hand grip 19 (extensions not shown) and give access to an orifice 190, to the wire cutting mechanism 25 and to the wire feeding mechanism 20 respectively. It should also be remarked that the control unit 29 normally supplies pressurized air to nipple 112 and conduit 117. This air is evacuated via the orifice 190 which may be obturated by the trigger 195 when the latter is pulled. When the flow of air through this orifice 190 is thus interrupted a signal is generated in the control unit 29 which then supplies pressurized air via one of the above mentioned conduits 290 to the tool 1 depending on a fixed program to be executed. The pneumatic control circuit of the control unit controlling the supply of air following this program is not described since this is a circuit of a known type.

The guide cylinder 13 is secured to the housing 10 by means of screws such as 111 fixed in the screw holes 106 and threaded holes 143 (FIG. 2) whilst the hand grip 19 and the deflector 28 are screwed onto the housing 10 by means of screws such as 110 fixed in the screw holes 107 and 108.

The wrapping bit 05 (called hereinafter bit for short) shown in FIG. 2 has a thick cylindrical portion 061 provided with a peripheral groove 051, a stop ring 055 to be mounted in the peripheral groove 055 and a tongue like element 054. The bit 05 further has a thin cylindrical portion 059 provided with a top-end 057 and terminal hole 052. A longitudinal groove 050 is milled in both the thick and thin cylindrical portions as shown. The top-end 057 is shown in detail in FIG. 17. This top-end 057 is constituted of a metal part of a very high hardness such as tungstencarbide for instance and has a widened longitudinal groove 056 and a notch 058 connecting the terminal hole 052 and the longitudinal groove 050. The widened longitudinal groove 056 has a substantial semi-circular cross-section and is delimited by the rim 060 at the junction with the longitudinal groove 050. This metal part protects the bit end from abnormal wear which is otherwise caused by the skinned wire gliding in the notch 058 during the wire wrapping operations. The bit 05 and the stop mechanism 040 are coupled together by means of the tongue like elements 054 and 041 (FIG. 18) and the bit 05 is further screwed onto the stop mechanism 040 by means of the nut 053 abuting against the stop ring 055 of the bit. It should be noted that this stop mechanism always stops the rotor of the motor 04 and consequently also the bit at the same angular position with respect to the stator. This stop mechanism and motor are of the conventional type and are therefore not described in detail.

Figure 15:
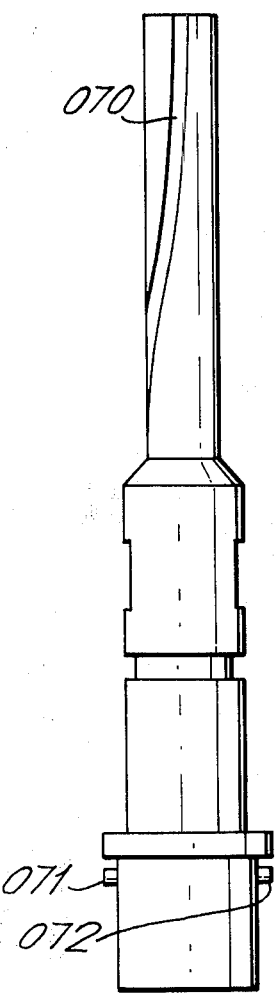
FIG. 15 shows a side view of the wrapping sleeve 07 shown in section in FIG. 1.
Figure 16:
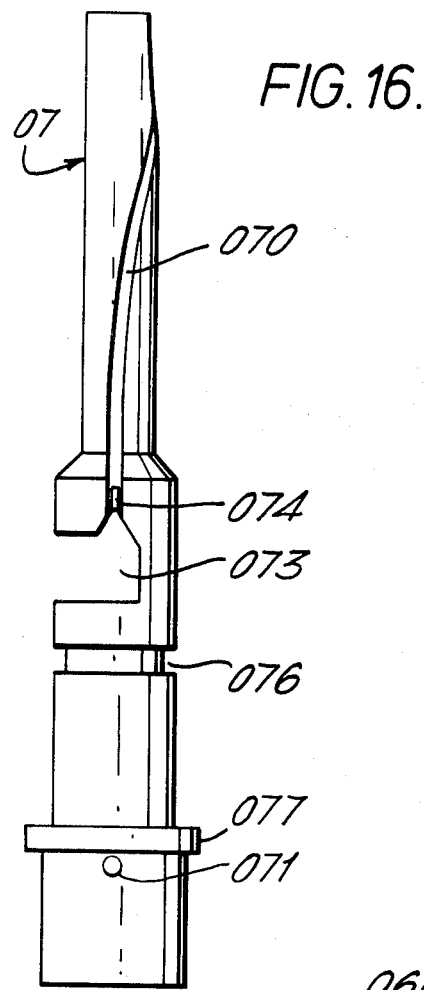
FIG. 16 shows a bottom view of the wrapping sleeve shown in side view in FIG. 15.

The wrapping sleeve 07 (called hereinafter sleeve for short) shown in FIGS. 2, 15 and 16 has a helical slit 070, two sleeve pins 071 and 072 (FIG. 15), a central hole 079 wherein the bit 05 may slide and cut-out portions 073 and 074. The cut-out portion 073 prolongs into the central hole 079 in the helical slit 070 and cut-out portion 074 the last one of which is situated diametrically opposite to the junction point of the cut-out portion 073 and helical slit 070 and serves to cut through the insulation of the insulated wire prior to the wire skinning operations as explained below. The sleeve 07 is rotatably mounted in the guide cylinder 13. The collar 077 and the annular spring 075, which is mounted in the annular groove 076, prevent an axial displacement of this sleeve in the guide cylinder 13.

The wire feeding mechanism 20 includes the following parts:

a wire feeding piston 200 provided with two jaws 205 and 205' pivoted about pivot axles such as 206 and kept inside the piston 200 by means of the annular spring 207 located in the annular groove 209. This piston further has a sealing ring 202 located in the annular groove 203, a rim 204 and chamfered edge 208.

a telescopic tube arrangement 210 constituted of 4 tubes which are able to telescope into each other and to be pulled out as shown. The tube 211 with the largest diameter and provided with a collar 213 is mounted onto the piston 200 by means of the nut 201. The tube 212 with the smallest diameter is fixed in the bush 214 by means of the nut 217 provided with an inner and outer thread. The bush 214 having a collar 215 is mounted in the deflector 28 and squeezes the sealing ring 216 between this collar 215 and the front wall 191 of the hand grip 19.

a cylinder 220 arranged in the hand grip 19. The piston 200 is able to reciprocate in this cylinder between its rest position and its end position. In this end position the nut 201 abuts against the endwall 223 of the cylinder 220. This cylinder is closed by means of a plug 225 which is screwed into the cylinder hole and is provided with sealing rings 226 and 227 through the latter of which the insulated wire 229 is fed from the reel 228. Pressurized air supplied via inter connected conduits 119 (FIG. 2) and 221 moves the piston 200 from its rest position to its end position in forward direction whilst the piston is moved from its end position to its rest position in backward direction when pressurized air is supplied via conduit 222. This conduit terminates in the cylinder space 145 so that the pistons 01 and 200 both move in backward direction when air is supplied to the nipple 105. The piston 200 is able to move from its rest and end position due to the fact that in these positions pressurized air is allowed to the rim 204 and chamfered edge 208 respectively. During the above forward movement the telescopic tube arrangement is pushed in whereby a length l of wire equal to the displacement length of the piston 200 is fed and the air in the cylinder 220 is evacuated via conduit 222.

During the backward movement of the piston 200 the telescopic tube arrangement is pushed out and the air in the cylinder 220 is evacuated via the conduit 221.

A knife 250 of the wire cutting mechanism 25 has a conical hole 251 through which the wire 229 may be fed to the deflector 28, a cutting edge 252 at the narrowed opening of this conical hole and a cut-out portion 253 wherein one end 254 of an L-shaped lever 225 engages. The other end 257 of this L-shaped lever 255 which is pivoted about a pivot axle 256 engages in a cut-out portion 258 of a U-shaped coupling piece 259 mounted on a rod 260 which is slidably mounted in a cylinder 264 arranged in the handgrip 19. The rod 260 is fixedly mounted onto the piston 265 slidably mounted into the cylinder 266. The spring 267 pushing the piston 265 to the left is kept in place by means of the plug 268, provided with a hole 262. This plug 268 is provided with a bush 273 to limit the stroke of the piston 265. It should be noted that the cylinder 264 has an enlarged portion 269 wherein the conduit 263 (shown in dashed lines) terminates to allow pressurized air supplied via interconnected conduits 118 ad 263 to reach the piston 265. Tightness is ensured by means of the piston sealing ring 271 and the sealing ring 261 mounted in the handgrip 19. When the piston 265 moves against the action of the spring 267 the knife 250 moves downward in the vertical slot 270 and cuts the wire 229.

The deflector 28 has an arc-shaped portion 280 to deflect the above mentioned length l of insulated wire fed by the wire feeding mechanism 20. A portion of this wire length l is fed through the cut-out portion 073 of the sleeve 07 in a direction substantially perpendicular to the sliding direction of the bit 05 as explained below.

Figure 20:
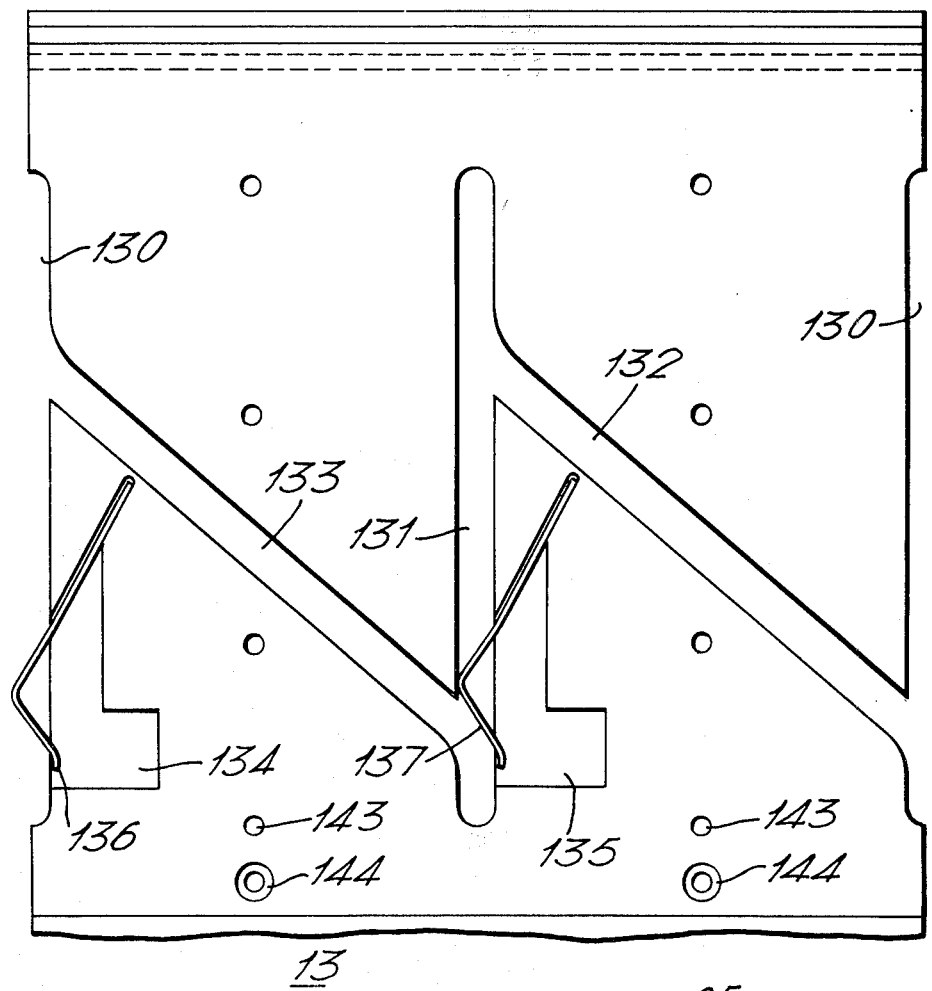
FIG. 20 is a developed view of the cylindrical part of the guide cylinder 13 shown in FIGS. 1 and 2.

Principally referring to FIG. 20 the latter represents a developed view of the cylindrical part of the guide cylinder 13. This guide cylinder has two straight slits 130 and 131 and two helical slits 132 and 133. These slits are oppositely situated in the guide cylinder 13 and at the junctions of the slits 130, 132 and 131, 133 there are provided L-shaped cut-out portions 134 and 135 wherein V-shaped springs 136 and 137 are located respectively. The guide cylinder 13 has two grooves 138 and 139 (FIG. 1) to locate two sealing rings 140 and 141 respectively. These sealing rings and the piston sealing ring 010 seal the left cylinder space 145 (FIG. 1). The guide cylinder 13 has threaded holes such as 143 and 144 (FIG. 20) for securing it to the housing 10 by means of screws such as 111 (FIG. 2) and for screwing the guide bush 167 to the guide cylinder by means of screws 170 and 171 respectively. In the rest position shown in FIG. 1 the piston pin 014 is engaged in the straight slit 130.

Figure 18:
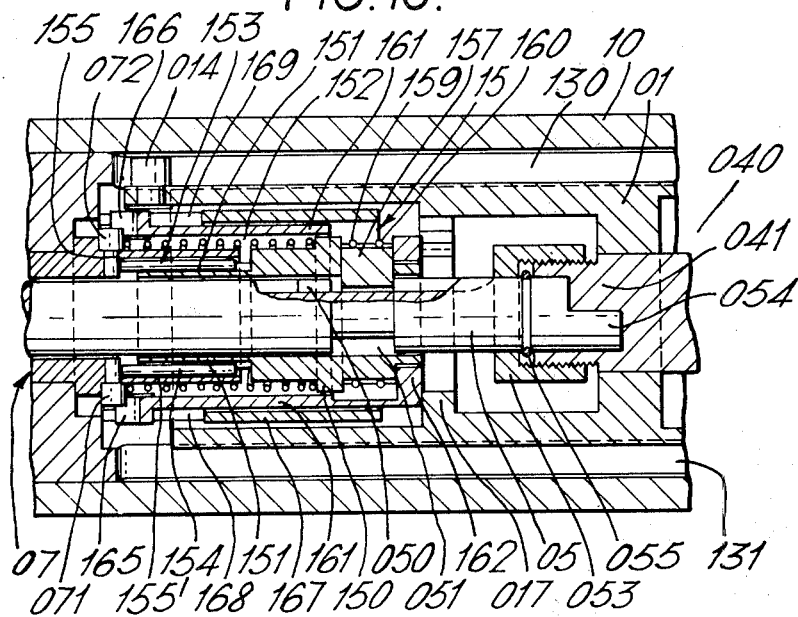
FIG. 18 shows a longitudinal section of the clutch mechanism 15 prior to the first wrapping operation.
Figure 19:
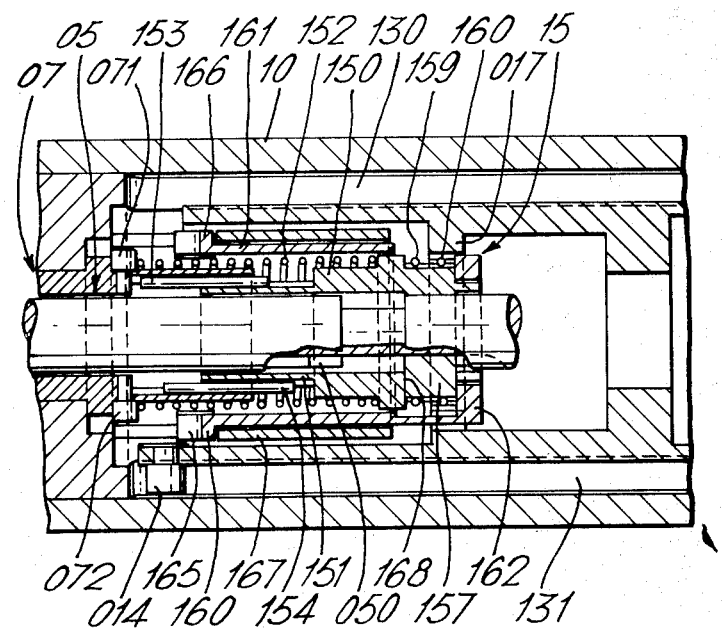
FIG. 19 shows a longitudinal section of the clutch mechanism prior to the second wrapping operation.

Principally referring to FIGS. 18 and 19, the clutch mechanism 15, a section of which is shown therein, is axially arranged around the bit 05 and includes a bush 150 the collar 151 of which is slidably mounted in the sleeve 07. This bush 150 which is normally held in the position by the action of the spring 152 is prevented from rotating with respect to the sleeve due to the presence of the two round keys 153 and 154 mounted in longitudinal grooves 155, 155' and 156, 156' (FIG. 2) of the sleeve 07 and bush 150 respectively. A rectangular key 157 with flattened tongue 158 (FIG. 2) is maintained in the bush 150 by means of the two annular springs 159 and 160.

Figure 14:
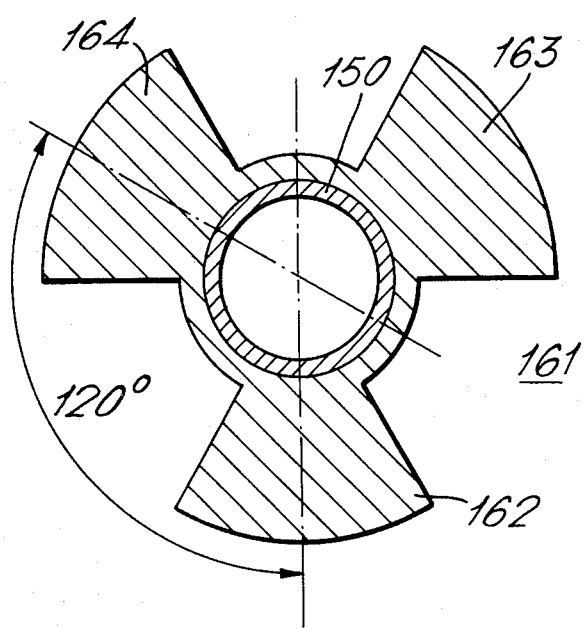
FIG. 14 is a cross section of the clutch mechanism 15 along line II—II of FIG. 1.

The coupling cylinder 161 has three teeth 162, 163 and 164 (FIG. 14) spaced from one another by 120° and two forks 165 and 166 shown in perspective in FIG. 2. The coupling cylinder 161 is slidably mounted in a guide bush 167 which is provided with two longitudinal slits 168 and 169 wherein the above forks 165 and 166 are engaged respectively. The guide bush 167 is rigidly mounted on the guide cylinder 13 by means of screws 170 and 171 fitting into guide cylinder holes such as 144 (FIG. 2). In FIG. 18 the clutch mechanism is shown in the position it occupies prior to the first wrapping operation. In this position three piston teeth 017, 018 and 019 (FIG. 3) abut against the three corresponding teeth 162, 163 and 164 of the coupling cylinder 161 pushing the latter and consequently also the bush 150 to the left against the action of the spring 152. As a consequence thereof the forks 165 and 166 engage the respective sleeve pins 071 and 072 coupling the sleeve 07 to the housing 10 via the guide bush 167 and the key 157 now projects into the peripheral groove 051 of the bit 05 which is thus able to rotate freely within the sleeve when the motor 04 is empowered.

In FIG. 19 the clutch mechanism is shown in the position it occupies prior to the second wrapping operation. In this position the three piston teeth 017, 018, 019 engage with the teech 162, 163, 164 of the coupling cylinder so that this coupling cylinder 161 and the bush 150 remain in their rest position. Consequently, the key 157 is engaged in the longitudinal groove 050 of the bit 05 thus coupling the sleeve 07 to the bit 05. The sleeve is now uncoupled from housing 10 since the forks 165, 166 are now disengaged from the sleeve pins 072 and 071 respectively.

FIGS. 4 to 13 show the operations sequences which are able to be carried out by means of the above described tool. Hereby reference is made to the timing diagram of the operations sequences to be found at the end of the description. In these figures the bit and sleeve are only partially represented. Every time when the trigger 195 is pulled a sequence of operations is carried out.

1ST OPERATIONS SEQUENCE (FIGS. 4 TO 7)

To start this first operations sequence the trigger 195 (FIG. 1) is actuated. As a consequence thereof the orifice 190 is shut off as explained before and the control unit 29 allows pressurized air to the wire feeding piston 200 via conduits 119 (FIG. 2) and 221 (FIG. 1) for a time interval T1 during which the piston 200 moves in forward direction from its rest position to its end position. At the start of this forward movement and due to the relative motion of the piston 200 and wire 229 and the action of the annular spring 207, the jaw pair 205, 205' pivot about the pivot axles such as 206 and grip the wire 229. During its further forward movement the piston pushes in the telescopic tube arrangement 210. A length $l$ (FIG. 5) of insulated wire lodged in this tube arrangement is thus fed via the knife 250 of the cutting mechanism 25 to the deflector 28 and is deflected in the arc-shaped portion 280 thereof. An insulated wire portion $l1$ (FIG. 5) is thus fed through the cut-out portion 073 (FIG. 2) of the sleeve 07 and is partially protruding therefrom when the wire feeding operation is finished i.e. at the end of the time interval T1. After this time interval T1 the control unit 29 allows pressurized air via conduit 103 (FIG. 2) to the rim 020 of the double acting piston 01 which then moves in forward direction from its rest position to its end position during a time interval T'1. As a consequence thereof, the bit 05 slides into the central hole 079 of the sleeve 07 in forward direction as shown on FIGS. 6 and 7. During this forward movement the piston 01 and bit 05 carry out a translational displacement since the piston pin 014 (FIG. 1) is guided into the straight slit 130 of the guide cylinder 13 (FIG. 20).

Figure 6:
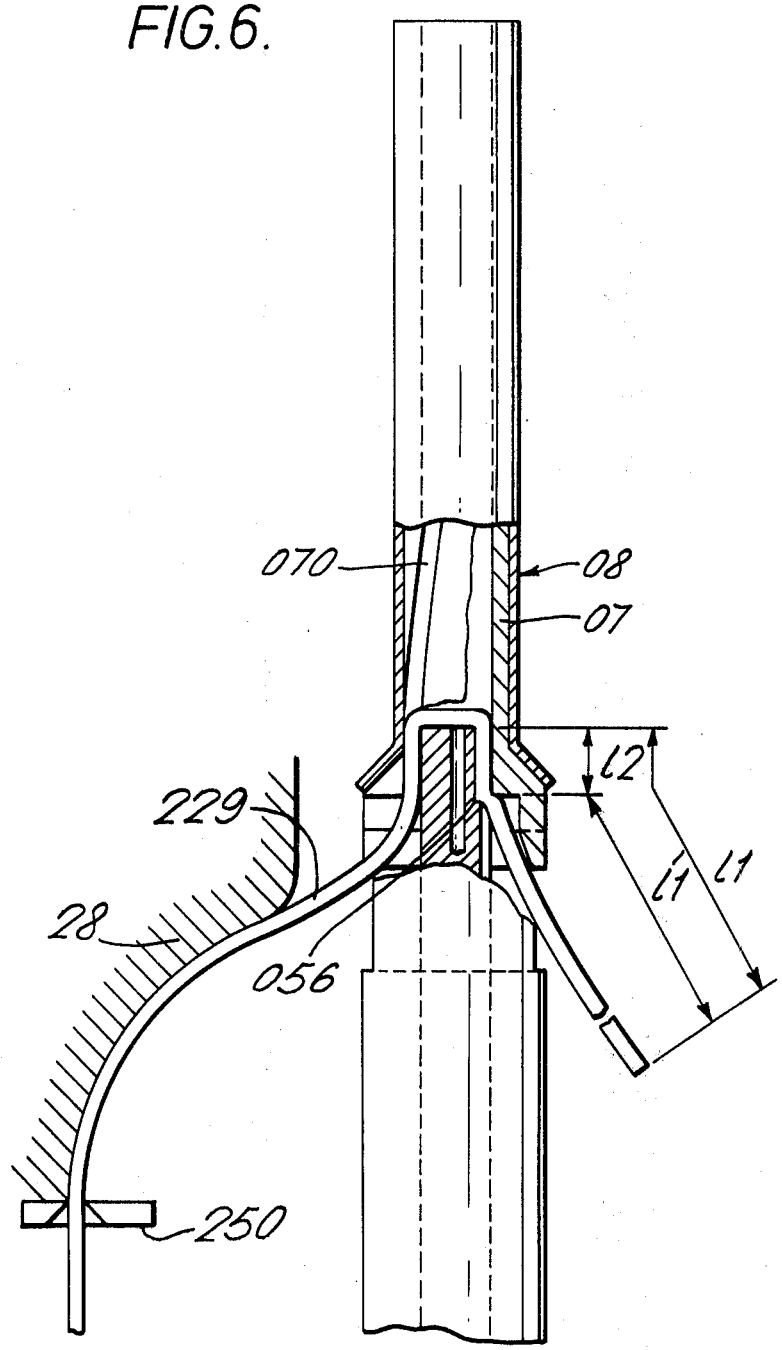
Figure 7:
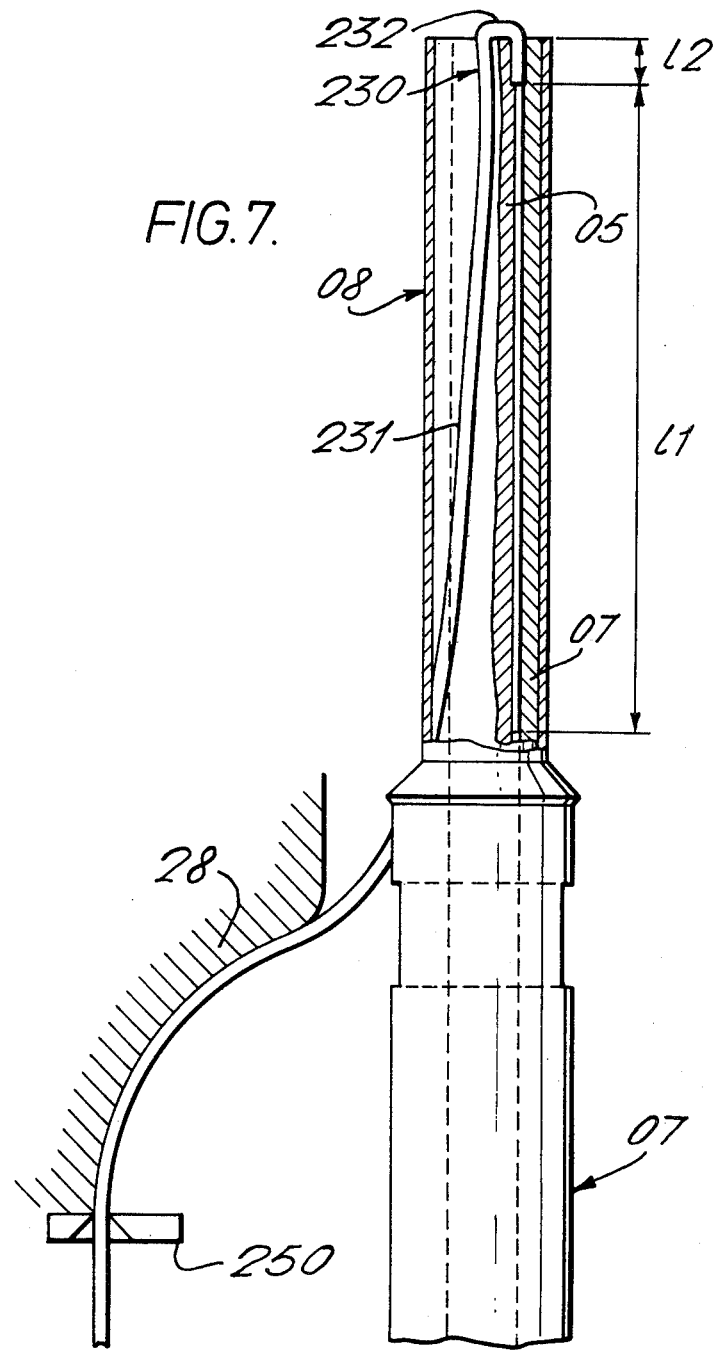
Figure 21:
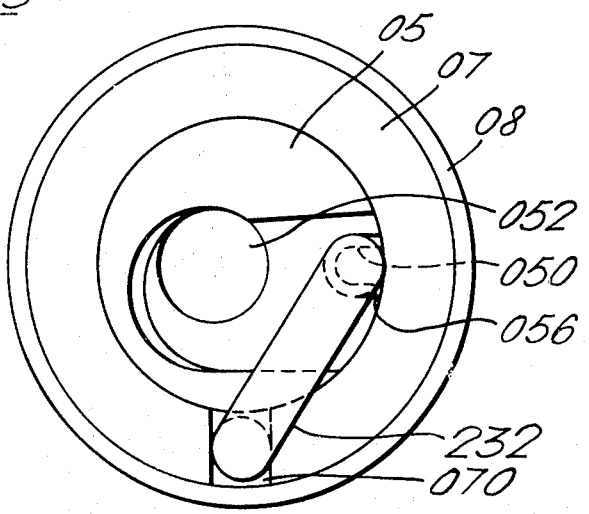
FIG. 21 is a top view of the wrapping sleeve and wrapping bit in his end position, after the first skinning operation.

When this translational movement of the bit starts the insulated wire is forced into the top-end groove 056 of the bit 05 on the one hand and into the helical slit 070 of the sleeve 07 on the other hand (FIG. 6). However, the skinning of the portion $l1$ of the insulated wire 229 only starts when the rim 060 (FIG. 5) of the groove 056 also shown in FIGS. 2 and 17 arrives in front of the cut-out portion 074 (FIG. 16) of the sleeve 07. This cut-out portion 074 acts as a knife to cut through the insulation of the insulated wire. Consequently, an insulated portion 12 of $l1$ becomes located in the widened longitudinal groove 056 whilst the remainder portion $l'1$ of $l1$ is skinned during the further forward movement of the bit 05. During this forward movement the wire emprisoned between the bit 05, the sleeve 07 and the protecting sleeve 08 becomes U-shaped. FIG. 7 shows the bit in its end position, the wire length $l'1$ of the U-shaped wire 230 being thus completely skinned. This skinned wire portion $l'1$ and the insulated portion 12 forming both one of the parallel legs of U-shaped wire 230 are located in the longitudinal grooves 050 and 056 of the bit 05 whilst the other insulated parallel leg 231 is lodged in the helical slit 070 of the sleeve 07. This insulated leg is prevented from leaving the helical slit 070 because of the protecting sleeve 08 being mounted over the sleeve 07. The transverse leg 232 shown in FIG. 21 disengages completely the terminal hole 052 in the wrapping bit 05 due to the helical form of the sleeve slit 070.

The following should now be noted.

During the above forward movement of the bit 05 the latter and the sleeve 07 remain keyed together by means of the key 157 (FIG. 2) which slides in the longitudinal groove 050 of the above bit so that no relative rotation movement is possible.

As mentioned earlier the end position of the bit 05 shown in FIG. 7 corresponds with the end position of the piston 01 and in this extreme position the three teeth 017, 018, 019 (FIG. 3) of the piston 01 abut against the three corresponding teeth 162, 163, 164 (FIG. 14) of the coupling cylinder 161 (FIG. 18) of the clutch mechanism 15. This coupling cylinder 161 is thus moved to the left together with the bush 150 against the action of the spiral spring 152. Due to this left displacement the forks 165 and 166 of the coupling cylinder 161 engage with the sleeve pins 071 and 072 due to which the wrapping sleeve is rigidly fixed to the housing 10 of the tool 1 as explained earlier.

This left displacement of the bush 150 disengages the wrapping bit 05 from the wrapping sleeve 07 since the key 157 is now protruding in the peripheral groove 051 of the bit 05. This means that in this end position the bit is able to rotate freely within the sleeve when the motor 04 is operated. This motor is operated when pressurized air admitted via the nipple 104 (FIG. 2) and conduit 116 which now give access to the holes 016 in the piston 01.

2ND OPERATIONS SEQUENCE (FIGS. 8 AND 9)

Figure 8:
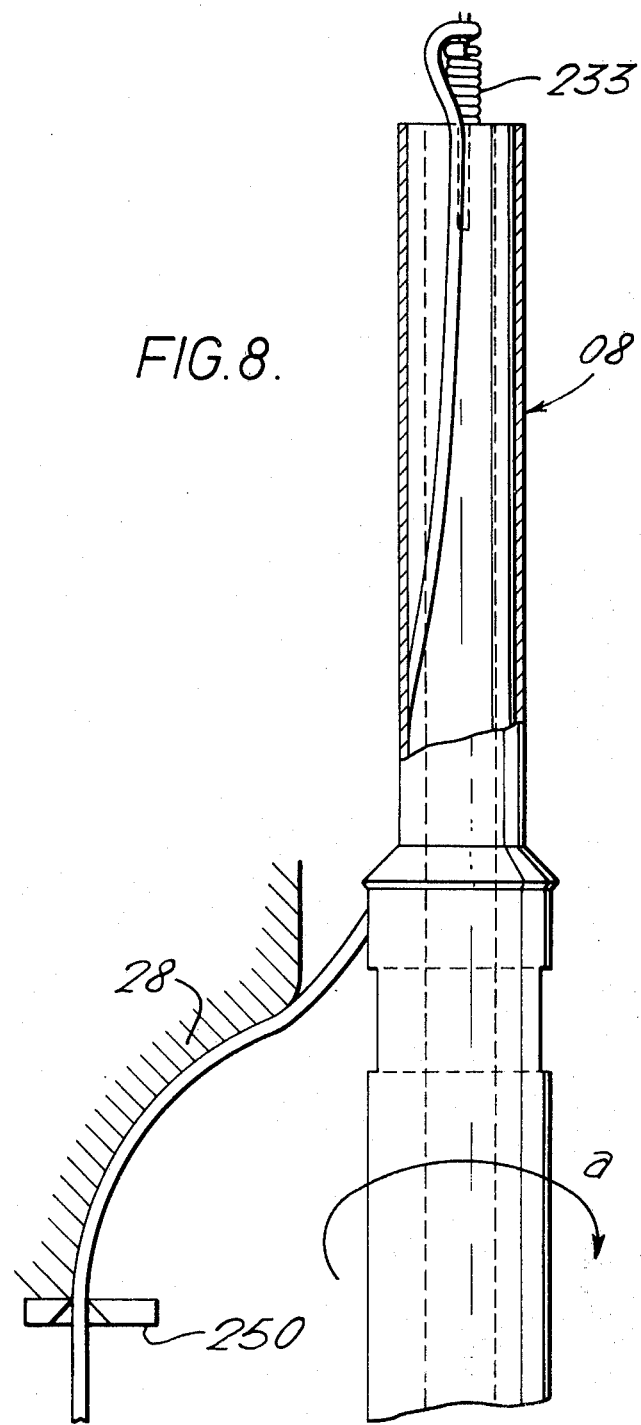
Figure 17:
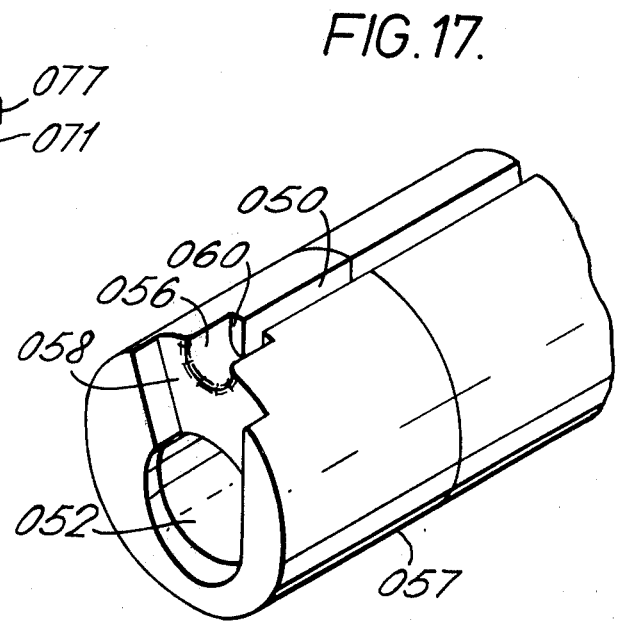
FIG. 17 is a perspective view of the top end of the wrapping bit 05 shown in FIG. 2.

Prior to the first wrapping operation the tool is positioned over the terminal 233 (FIG. 8) to be wrapped by inserting this terminal 233 into the terminal hole 052 of the wrapping bit 05. The trigger 195 is pulled a second time. Via the above mentioned conduit 116 and motor hole 016 pressurized air is admitted to the motor which is empowered for a time interval T2 during which the first wire wrapping operation is carried out (FIG. 8). This time interval is again defined by the control unit 29. It should be noted that only the bit is rotated during this wrapping operation since the sleeve 07 is rigidly coupled to the housing 10 and is uncoupled from the bit 05 as explained above. It is necessary to prevent the sleeve from rotating since otherwise the insulated wire would wind itself around the sleeve during the above mentioned wrapping operation. The wire wrapped terminal 233 is shown in FIG. 8. It should also be remarked that on the wire wrapped terminal 233 one or two insulated wire turns are wrapped due to the fact that the above mentioned wire portion 12 (FIGS. 6, 7) has not been skinned. During the wire wrapping operation the skinned wire portion $l'1$ lodged in the longitudinal groove 050 of the bit 05 glides in the notch 058 (FIG. 17). The curvature of this notch determines the traction force exerciced on the wire portion $l1$ and consequently also the tightness of the wire wrapped joint. It is obvious that in order to resist the wear caused by the above gliding movement it is necessary to harden the bit top-end or to provide the latter with a very hard top-end part such as tungstencarbide. After the time interval T2 the above air supply to the motor is shut off. Due to the action of the stop mechanism 040 the bit then stops at its initial position i.e. the positions occupied by the bit before the first wire wrapping operation.

Figure 9:
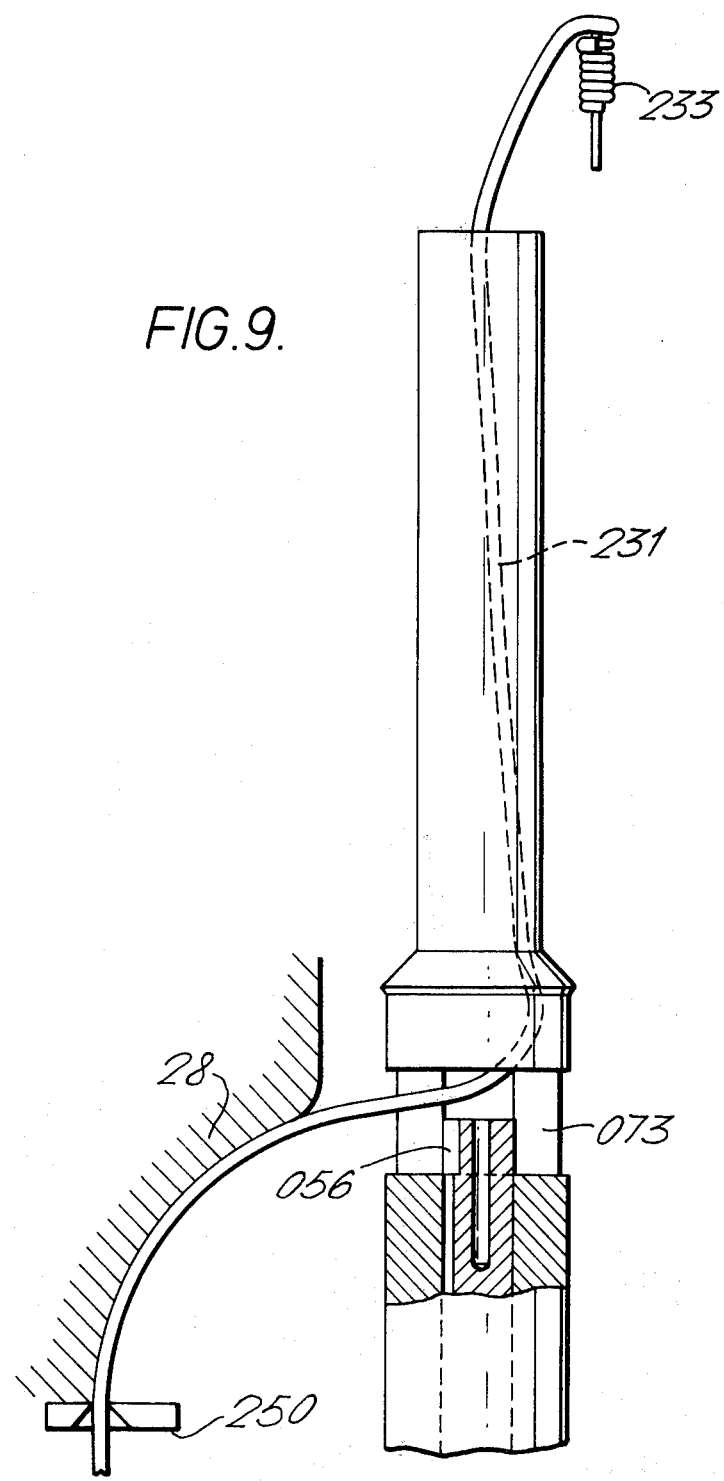
Figure 10:
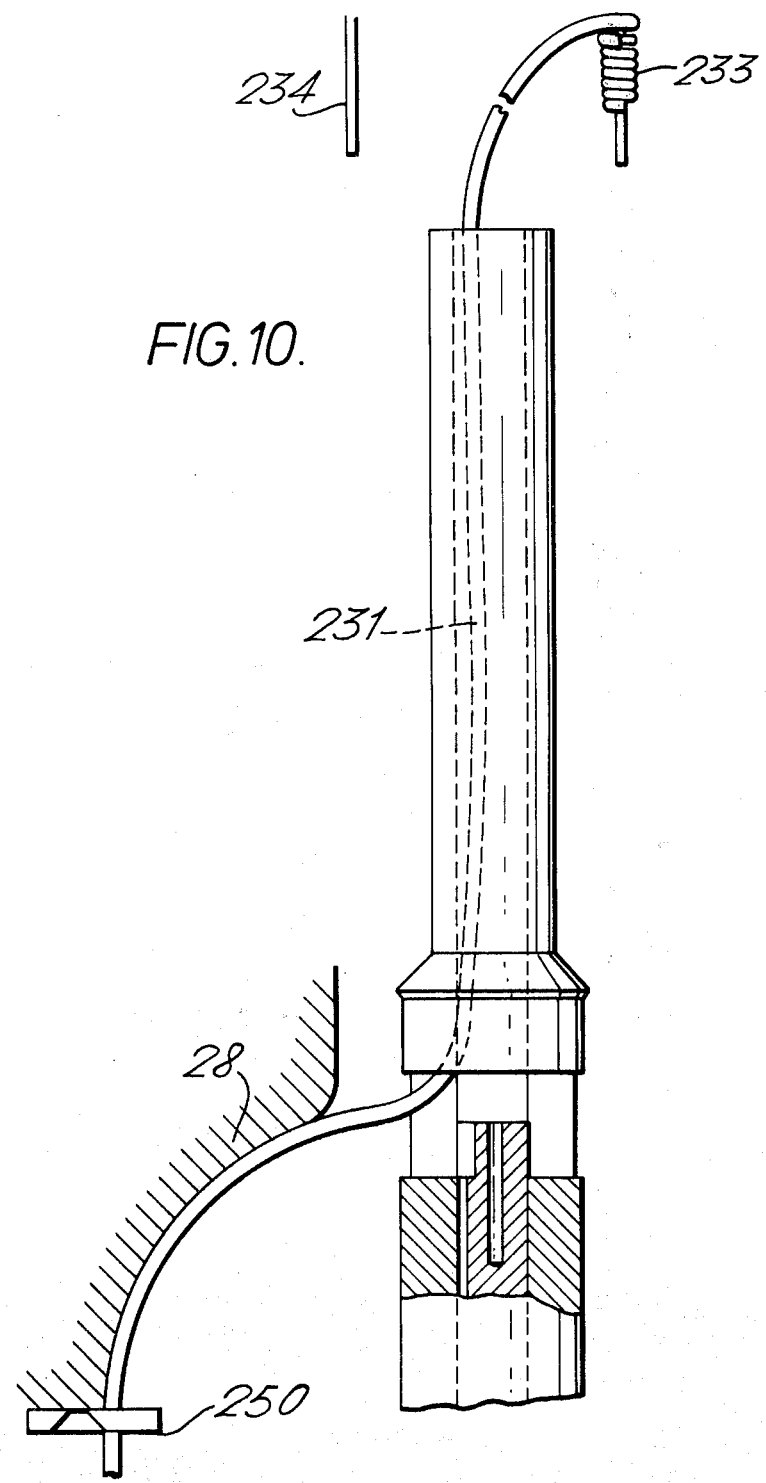

Via the conduits 115 and 222 and for a time interval T2' pressurized air is now simultaneously admitted to the respective pistons 01 and 200 both of which move in backward direction. During the backward movement of the first piston 01 and associated bit 05 they both rotate together with the sleeve 07 over an angle of 180° in the direction of the arrow a (FIG. 8) due to the fact that the piston pin 014 is now forced by the V-shaped spring 136 (FIG. 20) to follow the helicoid slit 132 in the guide cylinder 13, that the bit 05 remains keyed to the sleeve 07 via the bush 150 with key 157 and that the sleeve pins 071 and 072 (FIG. 18) have been disengaged from the forks 165 and 166 of the coupling cylinder 161 which moved backwards due to the action of spring 152. FIG. 9 shows the bit and sleeve in the rest position but rotated over 180° so that the cut-out portion 073 of the sleeve and the widened longitudinal groove 056 of the bit are in the positions shown. The reason of this rotation will become clear below.

During the backward movement of the wire feeding piston 200 the jaws 205 and 205' relax and the telescopic tube arrangement 210 is pulled out.

3RD OPERATIONS SEQUENCE (FIGS. 10 TO 12)

Figure 11:
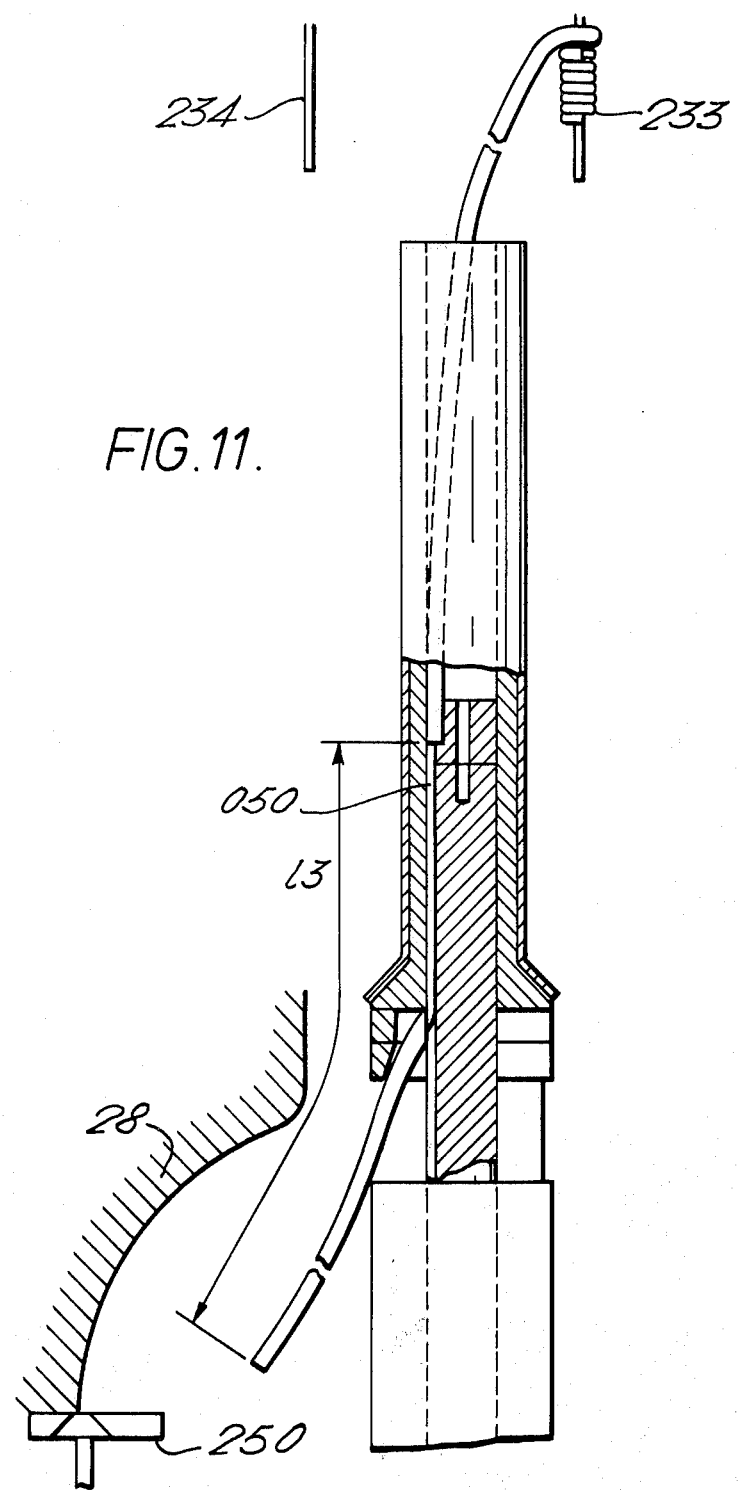
Figure 12:
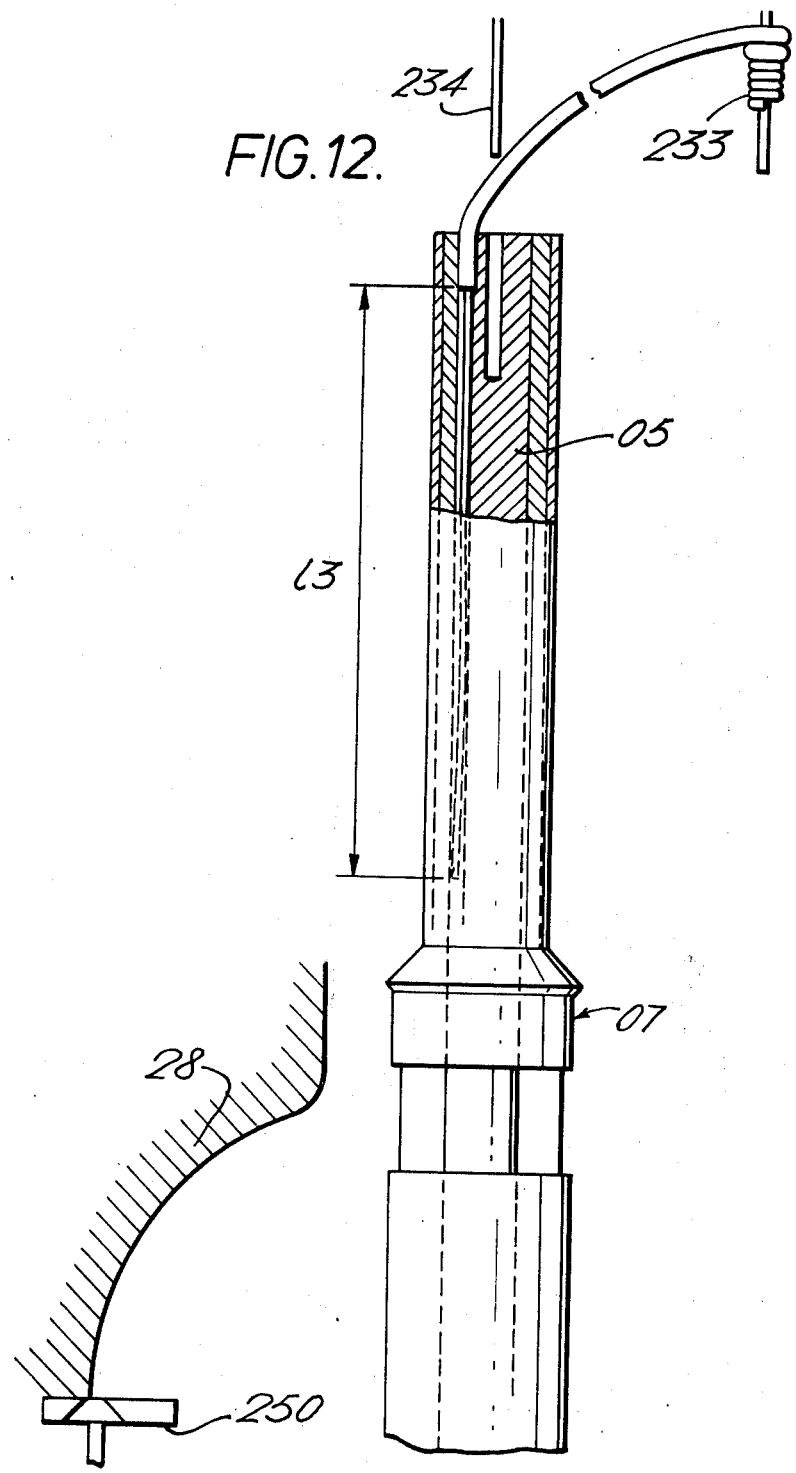

The tool 1 is now moved towards the second terminal 234 (FIG. 10) to be wrapped in order to provide enough wire length necessary for the interconnection of the first 233 and second 234 terminals. During this tool displacement the insulated wire 231 is disengaged from the helical slit of the sleeve as shown. The trigger 195 is pulled a third time whereby pressurized air is fed to the piston 265 of the wire cutting mechanism 25 via conduit 263. After a time interval T3 during which the wire cutting mechanism operates (FIG. 10) the pressurized air is shut off and the cutting knife 250 returns to its initial position. Immediately thereafter and during a time interval T'3 pressurized air is admitted to the double acting piston 01 via the conduit 103 as explained in the 1st operations sequence. The piston (01) and bit (05) are again moved in forward direction thereby effectuating a translational movement. During this translational movement the guide pin 014 of the piston 01 is guided in the second straight slit 131 of the guide cylinder 13 (FIG. 20). The forward movement of the bit is shown in FIG. 11 and this time the insulated wire portion 13 is skinned and this skinned wire portion is lodged in the longitudinal groove 050 of the bit 05 after the second skinning operation (FIG. 12). It is obvious that the longitudinal groove 050 and the cut-out portion 074 must necessarily be situated on the left side and therefore to rotate both the bit and sleeve over an angle of 180° since with the above groove and cut-out portion on the opposite side it would be impossible to carry out the second skinning operation. Moreover, with the sleeve slit 070 on the left side as in the previous cases the wire portion 13 would engage therein during the forward movement of the bit. FIG. 12 shows the bit, the sleeve 07 and skinned wire portion 13. The corresponding position of the clutch mechanism 15 is shown in FIG. 19.

Since the piston has been rotated over 180° the three teeth 017, 018 and 019 now engage with the teeth 162, 163 and 164 of the coupling cylinder 161.

Consequently this coupling cylinder 161 and bush 150 remain in their rest position. Due to this the sleeve is not coupled to the housing as explained before since the forks 165 and 166 do not engage with the sleeve pins 072 and 071 but the sleeve is now keyed to the bit via key 157 and bush 150.

4TH OPERATIONS SEQUENCE (FIG. 13)

Figure 13:
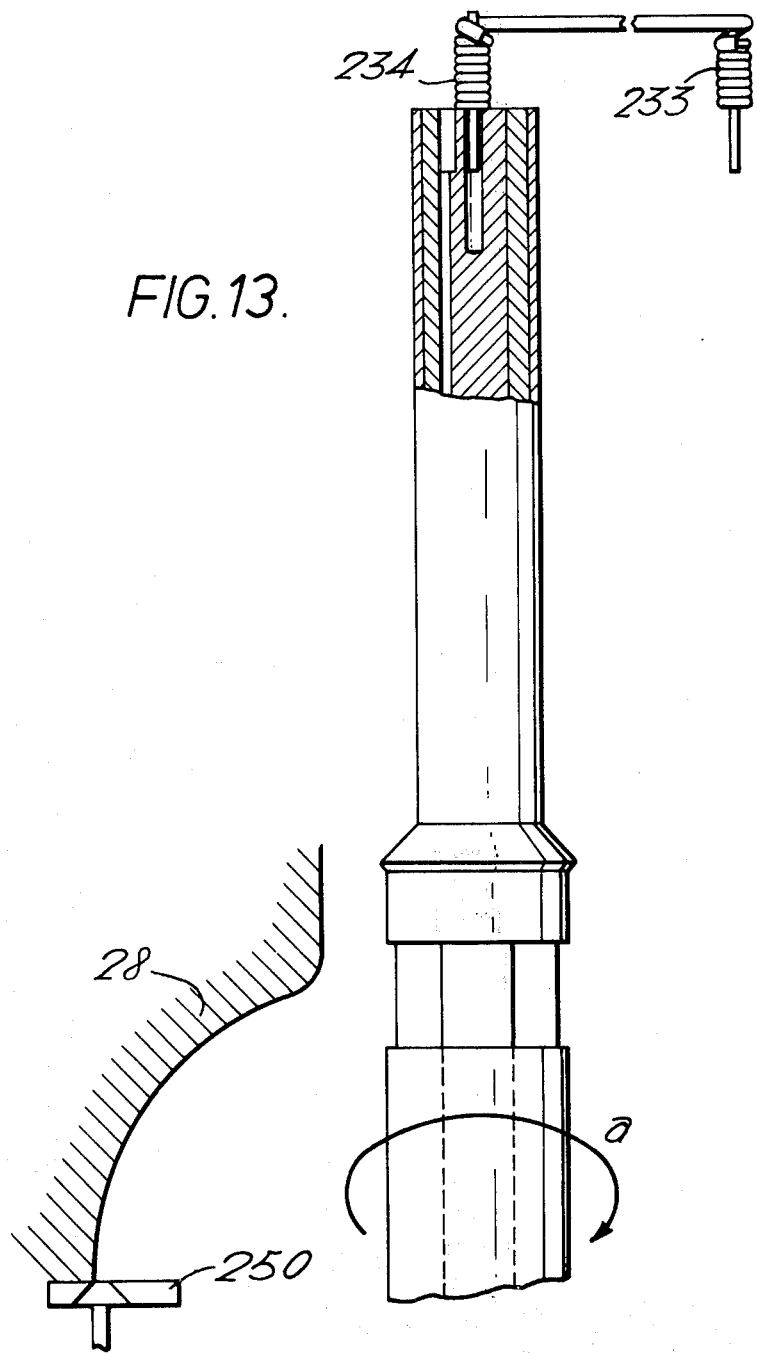

Prior to the second wrapping operation the tool is positioned over the terminal 234 to be wrapped. The trigger 195 is pulled a fourth time whereby pressurized air is admitted to the motor 04 via the conduit 116 and piston hole 016 for a time interval T4 during which the second wrapping operation is carried out (FIG. 13). After the time interval T4 the air supply is again shut off and the stop mechanism 040 stops the bit at its start position i.e. with the longitudinal groove 050 on the left side.

Figure 4:
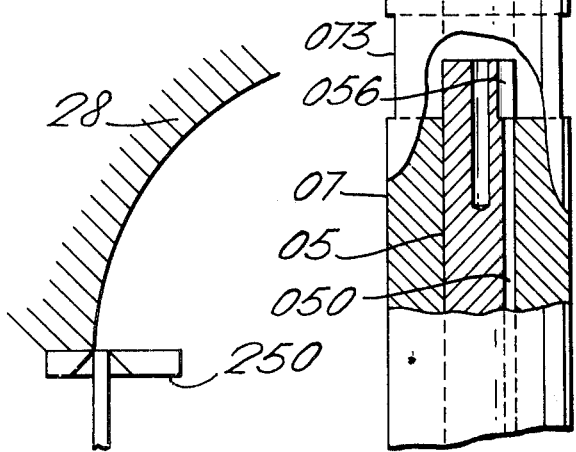
FIGS. 4 to 13 show the operation sequences of the wire skinning and wrapping tool.
Figure 5:
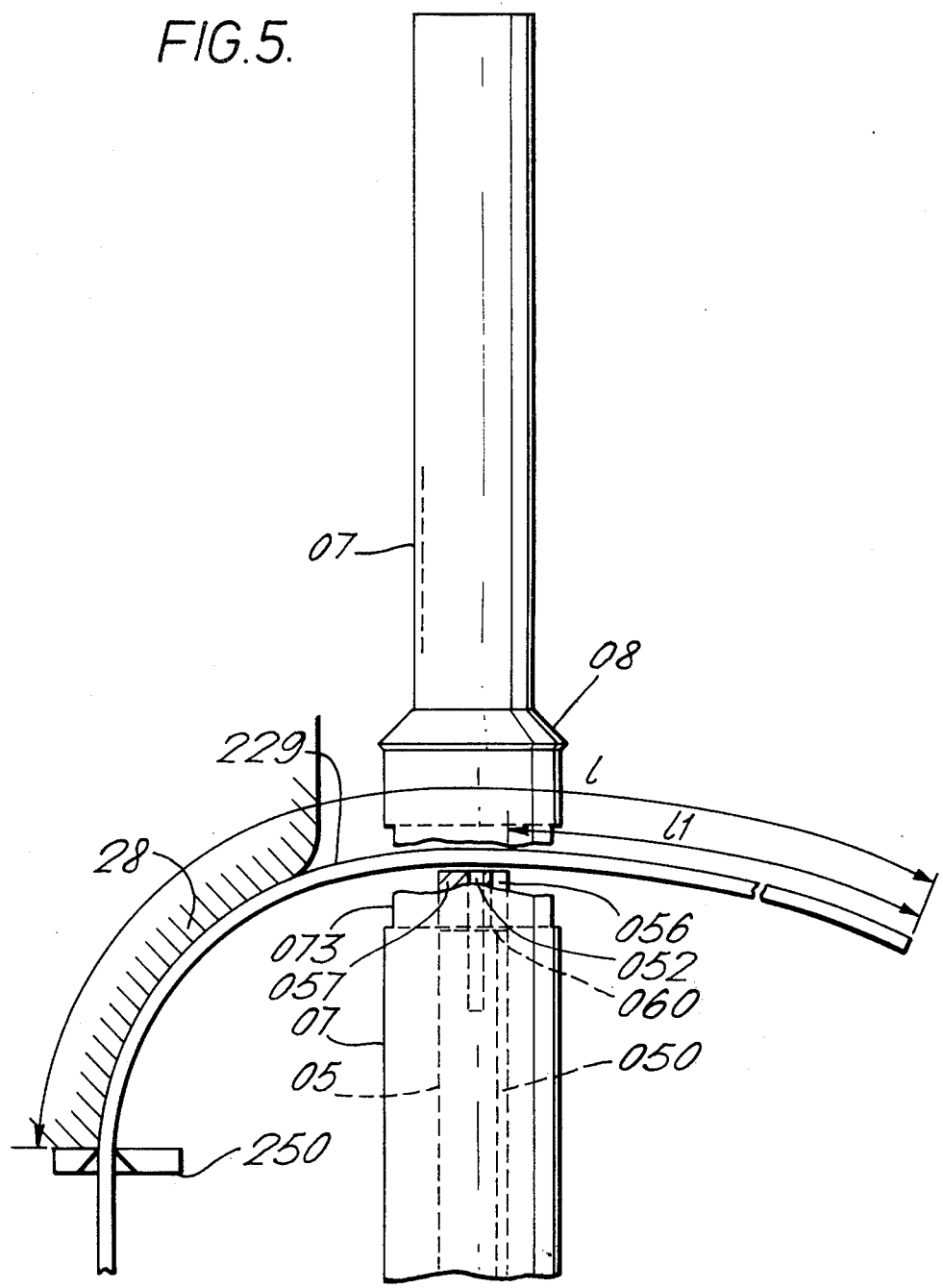

It should be noted that during this second wrapping operation the bit and sleeve rotate simultaneously since they are keyed together as explained above. This simultaneous rotation of the bit and sleeve prevents the skinned wire portion to project into the helical slit 070 of the sleeve during this second wire wrapping operation. This would have been the case if the sleeve had been maintained motionless. After the above time interval T4 and during a time interval T'4 pressurized air supplied via the conduit 115 moves the piston 01 and bit 05 again backwards toward their rest position but during this backward movement this position with bit 05 and sleeve 07 are again rotated over an angle of 180° in the same direction a as above. In this rest position the bit and sleeve are again in their initial position ready to make a new first wrapping (FIG. 4). It should be noted that the above mentioned rotation over 180° is due to the fact that the piston pin 014 is now urged by the V-shaped spring 137 to follow the helical slit 133 in the guide cylinder 13 and that during this backward movement the bit and sleeve are keyed together.

While the principles of the invention have been described above in connection with specific apparatus, it is to be clearly understood that this description is made only by way of an example and not as a limitation on the scope of the invention.

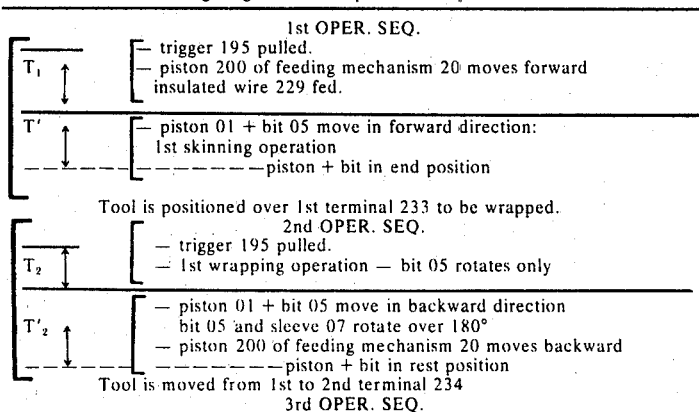

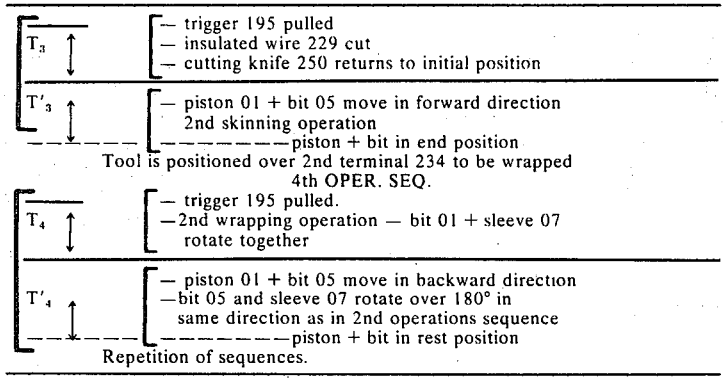

We claim:

1. A wire skinning and wrapping tool for carrying out successive first and second wire skinning and wrapping operations, said tool including rotatable skinning and wrapping means to skin a portion of an insulated wire and to wrap the so obtained skinned portion and second means to bring said portion to be skinned and wrapped and said skinning and wrapping means in proximity of each other prior to each of said first and second skinning operations so that said portion may then be skinned, characterized in that after each wrapping operation said second means are able to rotate said skinning and wrapping means (05, 07) so as to bring them in proximity of said portion to be skinned and wrapped.

2. A wire skinning and wrapping tool according to claim 1, characterized in that said skinning and wrapping means include a wrapping bit (05) slidably mounted in a wrapping sleeve (07) and able to cooperate therewith to skin a said portion when sliding in a forward direction prior to said wrapping operations, after each of which said wrapping bit slides in an opposite or backward direction and simultaneously rotates with said sleeve.

3. A wire skinning and wrapping tool according to claim 2, characterized in that said bit and sleeve are rotated over an angle of 180°.

4. A wire skinning and wrapping tool according to claim 2, characterized in that said tool further includes wire feeding means (20) and that said second means include a deflector (28) to deflect said insulated wire fed by said wire feeding means (20) from a direction substantially parallel to said sliding direction in a direction substantially perpendicular to said sliding direction.

5. A wire skinning and wrapping tool according to claim 2, characterized in that said wrapping bit has a terminal hole to be positioned over a terminal to be wrapped and a longitudinal groove (050) wherein said skinned wire portions (l'1, l3) become located during said forward sliding movement during which said first and second skinning operations take place and that said wrapping sleeve (07) has a helical slit (070) to locate an insulated portion (231) of said insulated wire during said first skinning operation whereby said insulated wire becomes U-shaped the parallel legs of which are said skinned wire portion (l1) and said insulated portion (231), said helical slit having a pitch such that the transverse leg (232) of said U-shaped wire does not obturate said terminal hole (052) at the end of said first skinning operation when said wrapping bit having slid in said forward direction is in its end position, thus permitting an easy positioning of said terminal hole over said terminal.

6. A wire skinning and wrapping tool according to claim 2, characterized in that said tool includes third means allowing said wrapping bit to rotate and said sleeve to be kept stationary during said first wrapping operation and allowing said wrapping bit and wrapping sleeve to rotate simultaneously during said second wrapping operation.

7. A wire skinning and wrapping tool according to claim 2, characterized in that said second means include a double acting piston 01, provided with a piston pin (014) and able to reciprocate in a cylinder (10) constituting the housing of said tool, said wrapping bit being fixed on said piston, and that said second means further include a guide cylinder (13) which is fixedly mounted in said housing (10) of said tool (1) and which has a first (130) and second (131) oppositely located straight slits and a first (132) and second (133) oppositely located helical slits having the same pitch and each extending between said first and second straight slits, said piston pin (014) being alternatively engaged in said first and second straight slits and said first and second helical slits during said successive forward and backward sliding movements of said wrapping bit respectively.

8. A wire skinning and wrapping tool according to claim 3, characterized in that at each junction of said first straight and helical slits and of said second straight and helical slits a V-shaped spring (136, 137) is located urging said piston pin (014) to engage alternatively in one of said first and second helical slits during said successive backward sliding movements of said bit and piston whereby said rotation over said angle of 180° of said bit occurs.

9. A wire skinning and wrapping tool according to claim 6, characterized in that said second and third means include a clutch mechanism (15) coupling said wrapping bit (05) to said wrapping sleeve (07) during said successive forward and backward sliding movements, and that said clutch mechanism further couples said wrapping sleeve to said housing of said tool and uncouples said wrapping bit from said wrapping sleeve only at the end of said forward sliding movement prior to said first wrapping operation.

10. A wire skinning and wrapping tool according to claim 9, characterized in that said clutch mechanism (15) includes a first or guide bush (167) which has a pair of slits (168, 169) and which is fixedly mounted in said guide cylinder (13), a coupling cylinder (161) provided with a pair of forks (165, 166) able to slide into said slits of said first bush (167) and to engage with sleeve pins (071, 072) mounted on said sleeve, said coupling cylinder having three teeth (162, 163, 164) each of which being spaced from one another by 120°, said clutch mechanism further including a second bush (150) coupled to said sleeve but able to slide with respect to it when said coupling cylinder (161) is displaced and having a key (157) able to key said second bush (150) and said bit together and that said piston (01) has also three teeth (017, 018, 019) spaced from one another by 120° and arranged in said piston such that at the end of said forward movement prior to said first wrapping operation said three teeth of said piston (017, 018, 019) abut against said three teeth (162, 163, 164) of said coupling cylinder (161) pushing the latter and said second bush (150) which couples said sleeve via said forks to said guide cylinder (13) and uncouples said key (157) from said bit respectively and such that at the end of said forward movement prior to said second wrapping operation said teeth of said piston engage with said teeth of said coupling cylinder (161) so that said second bush (150) remains coupled to said bit and said sleeve remains uncoupled from said coupling cylinder (161).

11. A wire skinning and wrapping tool according to claim 5, characterized in that said key (157) slides in said longitudinal groove (050) of said wrapping bit (05) thus coupling said wrapping bit (05) to said sleeve (07) and that said bit has a peripheral groove (051) wherein said key (157) protrudes prior to said first wrapping operation, thus uncoupling said bit from said sleeve.

12. A wire skinning and wrapping tool according to claim 5, characterized in that said longitudinal groove (050) widens at the top end of said bit where said terminal hole is situated, said widened groove (056) being adapted to locate a non skinned portion of insulated wire and that said top end is provided with a hardened part (057) having a notch (058) connecting said widened longitudinal groove (056) and said terminal hole (052) and wherein said skinned wire located in said longitudinal groove (050) glides during said wire wrapping operations.

13. A wire skinning and wrapping tool according to claim 6, characterized in that said third means include a motor (04) coaxially arranged in said piston (01), said wrapping bit being coaxially mounted onto said motor and that said wrapping sleeve is rotatably mounted in said guide cylinder (13) which is coaxially arranged together with said piston (01) and clutch mechanism (15).

14. A wire skinning and wrapping tool according to claim 4, characterized in that said wire feeding means (20) include a telescopic tube arrangement (210) mounted on a wire feeding piston (200) provided with a pair of jaws (205, 205'), which seize or release said insulated wire, when said wire feeding piston moves in a first direction to feed said insulated wire via said telescopic tube arrangement or when said feeding piston moves in a second or opposite direction respectively and that said telescopic tube arrangement is pushed in when said piston moves in said first direction.

15. A wire skinning and wrapping tool according to claim 4, characterized in that said wrapping sleeve has a first cut-out portion (073) through which said deflected insulated wire is fed in said perpendicular direction and a second cut-out portion (074) to cut through the insulation of said fed insulated wire prior to said skinning operations, said first cut-out portion being prolongated by said second cut-out portion which is situated always in front of said longitudinal groove (050) during said skinning operations.

16. A wire skinning and wrapping tool according to claim 5, characterized in that it includes a protecting sleeve (08) mounted on said wrapping sleeve to prevent said insulated part of said U-shaped wire to project out of said helical slit during said first wrapping operation.

17. A wire skinning and wrapping tool according to claim 4, characterized in that said tool includes wire cutting means to cut said insulated wire fed by said feeding means prior to said second skinning operation.

* * * * *